(12) United States Patent
Yaegashi

(10) Patent No.: US 11,981,516 B2
(45) Date of Patent: May 14, 2024

(54) CONTROL APPARATUS, PROGRAM, AND SYSTEM

(71) Applicants: KABUSHIKI KAISHA TOSHIBA, Minato-ku (JP); Toshiba Infrastructure Systems & Solutions Corporation, Kawasaki (JP)

(72) Inventor: Masaya Yaegashi, Tokyo (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 916 days.

(21) Appl. No.: 16/920,891

(22) Filed: Jul. 6, 2020

(65) Prior Publication Data

US 2020/0331708 A1 Oct. 22, 2020

Related U.S. Application Data

(63) Continuation of application No. PCT/JP2019/005864, filed on Feb. 18, 2019.

(30) Foreign Application Priority Data

Feb. 26, 2018 (JP) .................................. 2018-032303

(51) Int. Cl.
*B65G 47/90* (2006.01)
*B25J 9/16* (2006.01)
(Continued)

(52) U.S. Cl.
CPC .............. *B65G 47/90* (2013.01); *B25J 9/161* (2013.01); *B25J 9/1679* (2013.01); *B25J 9/1697* (2013.01);
(Continued)

(58) Field of Classification Search
CPC ............................. B65G 47/90; B65G 1/1373; B65G 2203/041; B65G 1/1371; B25J 9/161;
(Continued)

(56) References Cited

U.S. PATENT DOCUMENTS 10,179,699 B1 * 1/2019 Roper .................. B65G 1/1376
2011/0153065 A1   6/2011 Tomioka et al.
(Continued)

FOREIGN PATENT DOCUMENTS

JP        8-268512 A    10/1996
JP        9-124117 A    5/1997
(Continued)

OTHER PUBLICATIONS

International Search Report dated May 7, 2019 in PCT/JP2019/005864 filed Feb. 18, 2019, citing documents AA and AS-AV therein, 1 page.
(Continued)

*Primary Examiner* — Adam R Mott
*Assistant Examiner* — Matthew C Gammon
(74) *Attorney, Agent, or Firm* — Maier & Maier, PLLC

(57) ABSTRACT

To solve the above problem, a control apparatus, a program, and a system that are capable of effectively providing picking information are provided.
According to an embodiment, a control apparatus includes an image interface, a communication unit, and a processor. The image interface obtains an instruction image indicating information of articles to be picked. The communication unit transmits and receives data to and from a robot system that picks the articles. The processor generates picking information of the articles to be picked from the instruction image, and transmits the picking information to the robot system via the communication unit.

5 Claims, 4 Drawing Sheets

(51) Int. Cl.
  *B25J 13/08* (2006.01)
  *B65G 1/137* (2006.01)

(52) U.S. Cl.
  CPC .......... *B25J 13/08* (2013.01); *B65G 1/1373* (2013.01); *B65G 2203/041* (2013.01)

(58) Field of Classification Search
  CPC ........ B25J 9/1679; B25J 9/1697; B25J 13/08; G05B 2219/32037; G05B 2219/45063
  See application file for complete search history.

(56) References Cited

U.S. PATENT DOCUMENTS

| | | | |
|---|---|---|---|
| 2012/0236140 A1 | 9/2012 | Hazeyama et al. | |
| 2016/0304281 A1* | 10/2016 | Elazary | B25J 15/06 |
| 2018/0065156 A1* | 3/2018 | Winkle | B65G 1/1371 |

FOREIGN PATENT DOCUMENTS

| | | |
|---|---|---|
| JP | 2000-219317 A | 8/2000 |
| JP | 2004-338931 A | 12/2004 |
| JP | 2008-9818 A | 1/2008 |
| JP | WO 2010/023795 A1 | 3/2010 |
| JP | 2015-76042 A | 4/2015 |
| JP | 2015-218013 A | 12/2015 |
| JP | 6011490 B2 | 10/2016 |
| JP | 6167760 B2 | 7/2017 |
| WO | WO 2016/135861 A1 | 9/2016 |
| WO | WO 2017/198281 A1 | 11/2017 |

OTHER PUBLICATIONS

Extended European Search Report dated Jul. 20, 2021 in corresponding European Patent Application No. 19757257.1 citing documents AA, AB, AO-AR therein, 11 pages.

* cited by examiner

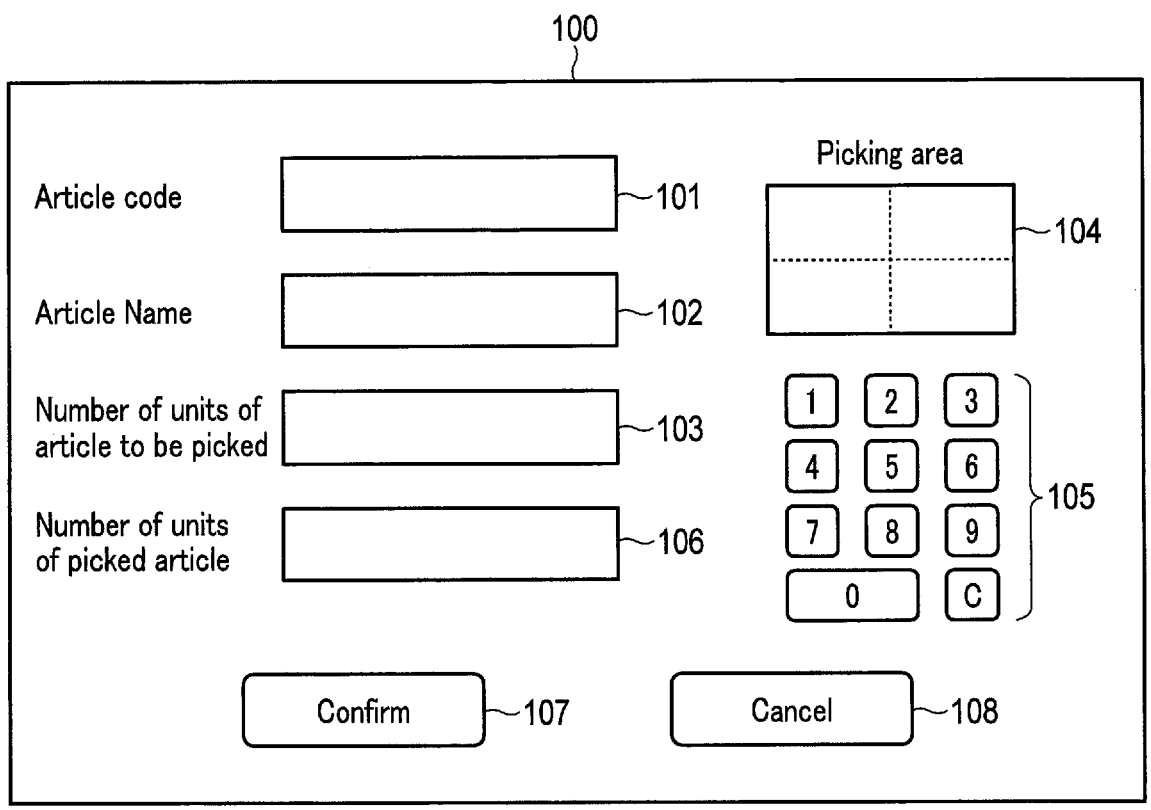
F I G. 4

CONTROL APPARATUS, PROGRAM, AND SYSTEM

CROSS-REFERENCE TO RELATED APPLICATIONS

This application is a Continuation Application of PCT Application No. PCT/JP2019/005864, filed Feb. 18, 2019 and based upon and claiming the benefit of priority from Japanese Patent Application No. 2018-032303, filed Feb. 26, 2018, the entire contents of all of which are incorporated herein by reference.

FIELD

Embodiments described herein relate generally to a control apparatus, a program, and a system.

BACKGROUND

As a picking system that automatically picks articles, a system that picks articles based on picking information indicating articles to be picked and the number of units thereof is known. To introduce such a picking system, a management system for management of automatic warehouse storing of articles needs to provide picking information to the picking system.

This requires replacement or modification of an existing management system, and high costs required for such replacement and modification have been a problem.

CITATION LIST

Patent Literature 1
Jpn. Pat. Appln. KOKAI Publication No. 2015-76042

SUMMARY

To solve the above problem, a control apparatus, a program, and a system that are capable of effectively providing picking information are provided.

According to an embodiment, a control apparatus includes an image interface, a communication unit, and a processor. The image interface obtains an instruction image indicating information of articles to be picked. The communication unit transmits and receives data to and from a robot system that picks the articles. The processor generates picking information of the articles to be picked from the instruction image, and transmits the picking information to the robot system via the communication unit.

BRIEF DESCRIPTION OF THE DRAWINGS

FIG. 4 is a diagram showing a configuration example of an instruction image according to the embodiment.

DETAILED DESCRIPTION

An embodiment will be described in detail with reference to the drawings.

A picking system according to the embodiment picks a predetermined number of units of an article from a tray, using a robot. The picking system discharges a predetermined tray using an automatic warehouse. The picking system picks up an article from the discharged tray, using a robot.

For example, the picking system is installed in a building of a distribution center of article distribution. The picking system picks components, merchandise, or packing boxes, as articles. The articles picked up by the picking system are not limited to particular articles.

Figure 1:
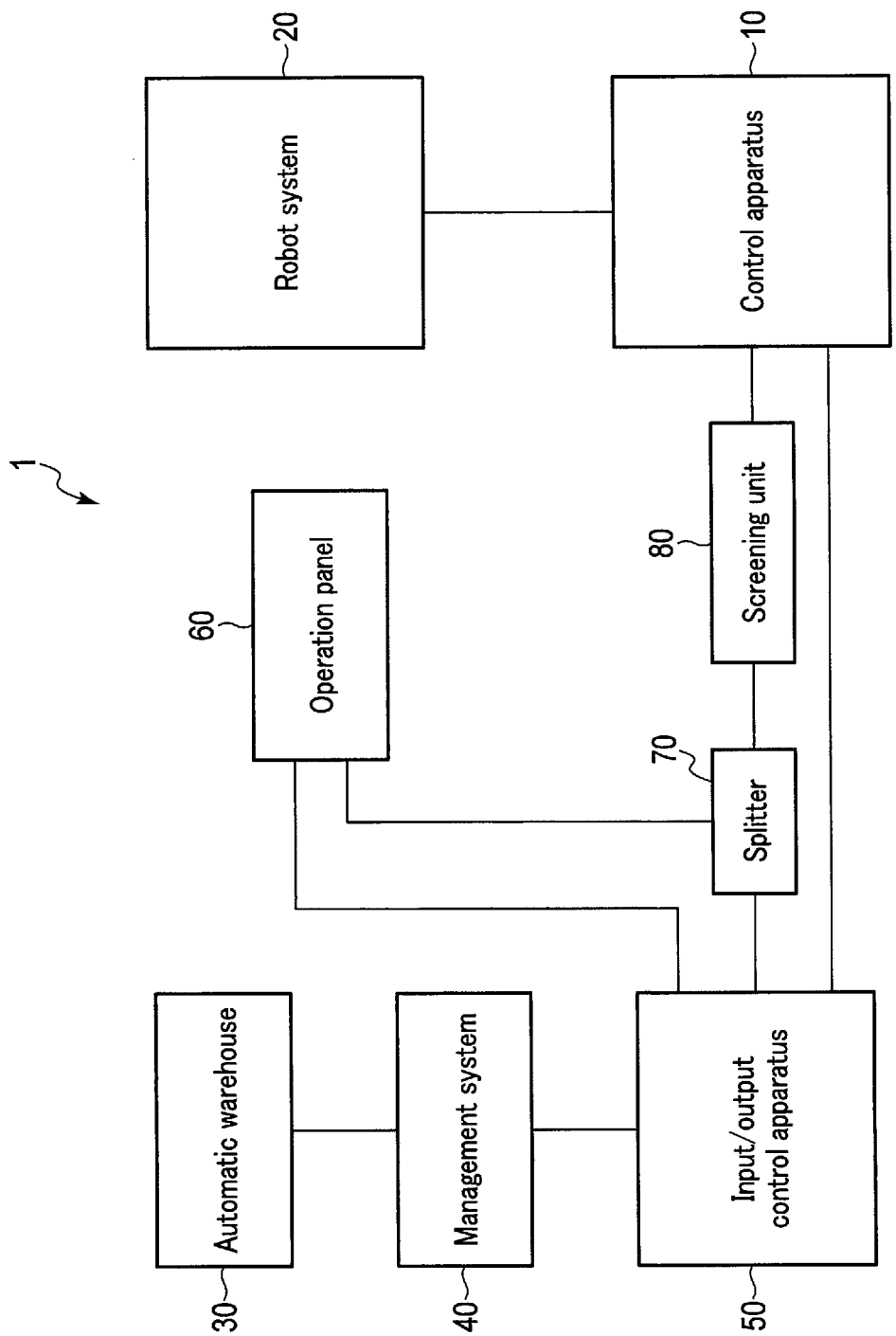
FIG. 1 is a block diagram showing a configuration example of a picking system according to an embodiment.

FIG. 1 is a block diagram showing a configuration example of a picking system 1 according to the embodiment. As shown in FIG. 1, the picking system 1 is comprised of a control apparatus 10, a robot system 20, an automatic warehouse 30, a management system 40, an input/output control apparatus 50, an operation panel 60, a splitter 70, a screening unit 80, and so on.

The control apparatus 10 is electrically connected to the robot system 20, the input/output control apparatus 50, and the screening unit 80. The screening unit 80 is electrically connected to the splitter 70. The splitter 70 is electrically connected to the input/output control apparatus 50 and the operation panel 60. The management system 40 is electrically connected to the automatic warehouse 30 and the input/output control apparatus 50.

The picking system 1 may include structures other than those shown in FIG. 1 as needed, or may exclude any particular structure.

The control apparatus 10 provides picking information to the robot system 20. The picking information indicates information of an article to be picked from a tray. The control apparatus 10 and the picking information will be described later in detail.

The robot system 20 picks an article from a tray discharged by the automatic warehouse 30, based on the picking information. For example, the robot system 20 moves an article from a tray discharged by the automatic warehouse 30 to a predetermined container. The configuration of the robot system 20 will be described later in detail.

The automatic warehouse 30 discharges a tray based on a signal from the management system 40, etc. The automatic warehouse 30 stores a plurality of trays. The automatic warehouse 30 discharges a predetermined tray among a plurality of trays to a predetermined discharge slot. The automatic warehouse 30 is comprised of a control unit and a carrier unit, etc. The control unit controls the carrier unit, etc. to discharge a predetermined tray. The carrier unit is comprised of a conveyor or a robot that carries trays.

The management system 40 controls the automatic warehouse 30. The management system 40 controls the input/output control apparatus 50. The management system 40 obtains an order indicating an article to be picked (a taken-out article), from an operator or an external apparatus. For example, the management system 40 receives an input of an order through an operation unit. The management system 40 receives an order from an external apparatus.

The management system 40 specifies a tray for storing the taken-out article. For example, the management system 40 specifies a tray by referring to a predetermined database. The management system 40 transmits a signal to the automatic warehouse 30 to cause the automatic warehouse 30 to discharge the specified tray.

The management system 40 transmits article information relating to a taken-out article to the input/output control apparatus 50. The article information indicates information indicating a taken-out article (its name or code), the number of units of an article to be picked ("picking number"), and a location of the taken-out article in the tray. The content of the article information is not limited to particular content.

The management system 40 manages the picking of a taken-out article in accordance with signals from the input/output control apparatus 50. The management system 40 receives a signal relating to the picking of a taken-out article from the input/output control apparatus 50. For example, the management system 40 receives, from the input/output control apparatus 50, a signal indicating completion or failure of the picking of a taken-out article. Furthermore, the management system 40 may receive a signal indicating the number of units of a taken-out article successfully picked. The management system 40 manages a result of the picking of a taken-out article, in accordance with the signal. The management system 40 is comprised of a personal computer, etc., for example.

The input/output control apparatus 50 controls signals input to and output from the management system 40. The input/output control apparatus 50 externally provides information from the management system 40, through the operation panel 60. The input/output control apparatus 50 receives an operation input through the operation panel 60, and transmits a predetermined signal to the management system 40 in accordance with the received operation input.

The input/output control apparatus 50 generates an instruction image indicating a taken-out article based on the article information from and the management system 40. The instruction image indicates information indicating a taken-out article (its name or code), a picking number, and a location of the taken-out article in a tray. The instruction image visually indicates information relating to the taken-out article. In other words, the instruction image is an image displayed on the operation panel 60 that provides information of the taken-out article to the operator, etc. The instruction image will be described later in detail.

The input/output control apparatus 50 transmits an image signal of a generated instruction image to the splitter 70. The input/output control apparatus 50 may transmit image signals of other images to the splitter 70.

The input/output control apparatus 50 receives an input of information relating to the picking of a taken-out article, through the operation panel 60. For example, the input/output control apparatus 50 receives an operation input indicating that the picking of a taken-out article has been completed or failed. The input/output control apparatus 50 may receive an operation input indicating the number of units of the taken-out article that has been picked.

The input/output control apparatus 50 transmits a signal relating to the picking of the taken-out article to the management system 40 in accordance with the received operation input. The input/output control apparatus 50 is comprised of a personal computer, for example.

The splitter 70 splits an image signal to display an image. The splitter 70 splits an image signal transmitted from the input/output control apparatus 50 into the operation panel 60 and the screening unit 80. The image signal split by the splitter 70 is a duplicate of the image signal transmitted from the input/output control apparatus 50.

The operation panel 60 is an interface that receives an instruction input from the operator, and displays various types of information to the operator. The operation panel 60 consists of an operation unit that receives an input of instructions and a display unit that displays information.

The operation panel 60 transmits a signal indicating an operation received from the operator to the input/output control apparatus 50, as an operation of the operation unit. Herein, the operation unit consists of a touch panel.

The operation panel 60 displays an image based on the image signal from the splitter 70, as an operation of the display unit. For example, the display unit consists of a liquid crystal monitor. The display unit is formed integrally with the touch panel serving as the operation unit. The operation unit may further include a keyboard or a ten-key keyboard.

The screening unit 80 performs screening on the image signal transmitted from the splitter 70. If the screening unit 80 receives the image signal of the instruction image from the splitter 70, the screening unit 80 transmits the image signal to the control apparatus 10. If the image signal belongs to an image other than the instruction image, the screening unit 80 blocks the image signal. If screening of an image signal transmitted from the splitter 70 is unnecessary, the screening unit 80 may not be provided.

Figure 2:
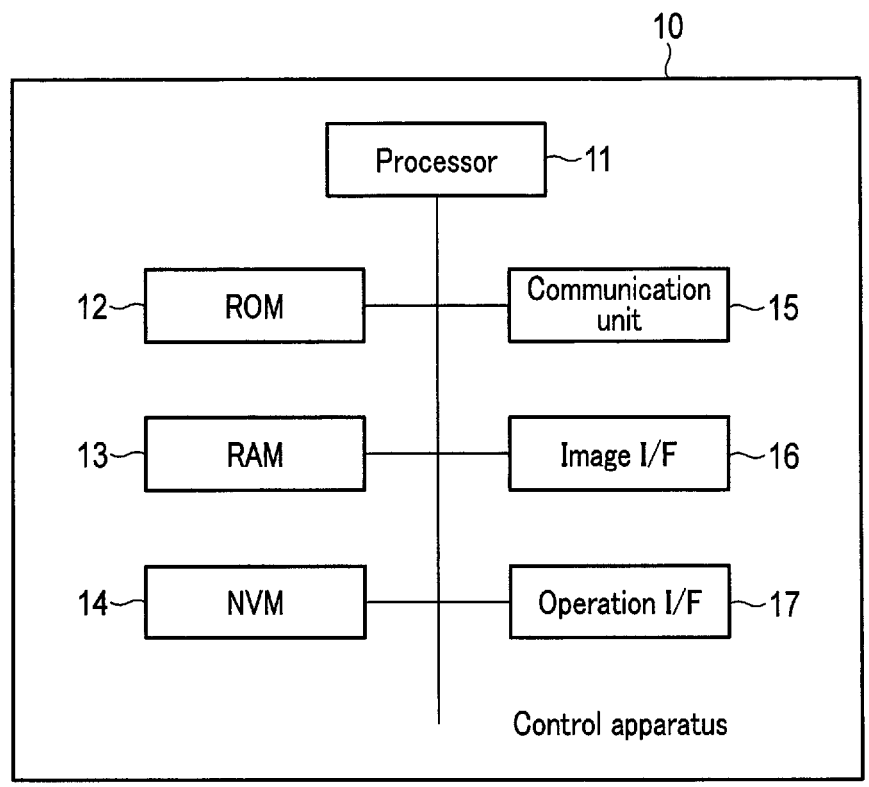
FIG. 2 is a block diagram showing a configuration example of a control apparatus according the embodiment.

Next, the control apparatus 10 will be described. FIG. 2 is a block diagram showing a configuration example of the control apparatus 10. As shown in FIG. 2, the control apparatus 10 includes a processor 11, a ROM 12, a RAM 13, an NVM 14, a communication unit 15, an image interface 16, and an operation interface 17. Each of the units is connected to each other via a data bus. The control apparatus 10 may include a structure in addition to the structures shown in FIG. 2 as needed, or exclude any of the structures.

The processor 11 has a function of controlling the entire operation of the control apparatus 10. The processor 11 may include an internal cache and various types of interfaces. The processor 11 realizes various types of processing by executing programs recorded in advance on the internal cache, the ROM 12, or the NVM 14.

The various functions realized through the execution of the programs by the processor 11 may be partially realized by a hardware circuit. In this case, the processor 11 controls the functions carried out by the hardware circuit.

The ROM 12 is a nonvolatile memory storing control programs and control data in advance. The control programs and control data stored in the ROM 12 are incorporated in advance in accordance with the specification of the control apparatus 10. The ROM 12 stores, for example, a program for controlling a circuit substrate of the control apparatus 10.

The RAM 13 is a nonvolatile memory. The RAM 13 temporarily stores data under processing by the processor 11, for example. The RAM 13 stores various application programs based on instructions from the processor 11. The RAM 13 may store necessary data for executing the application program and results of the execution of the application program.

The NVM 14 is a nonvolatile memory unwritable and unrewritable. The NVM 14 may be comprised of a hard disk drive (HDD), a solid state drive (SSD), an EEPROM (registered trademark) (Electrically Erasable Programmable Read-Only Memory), or a flash memory. The NVM 14 stores control programs, applications, and various types of data, in accordance with a purpose of the control apparatus 10.

The communication unit 15 is an interface for transmitting and receiving data to and from the robot system 20. The communication unit 10 may be connected to the robot system 20 via a predetermined communication network. The communication unit 15 is an interface supporting a LAN (local area network) connection, for example.

The image interface 16 is an interface for obtaining an image from the splitter 70. In other words, the image interface 16 obtains an image signal from the splitter 70. The image interface 16 is an interface supporting a VGA (video graphics array) connection, for example.

The operation interface 17 is an interface for transmitting operation signals to the input/output control apparatus 50. The operation interface 17 transmits an operation signal similar to the operation signal indicating an operation input to the operation panel 60, to the input/output control apparatus 50. The operation interface 17 is for example an interface supporting a USB (universal serial bus) connection. The control apparatus 10 is a personal computer, for example.

Figure 3:
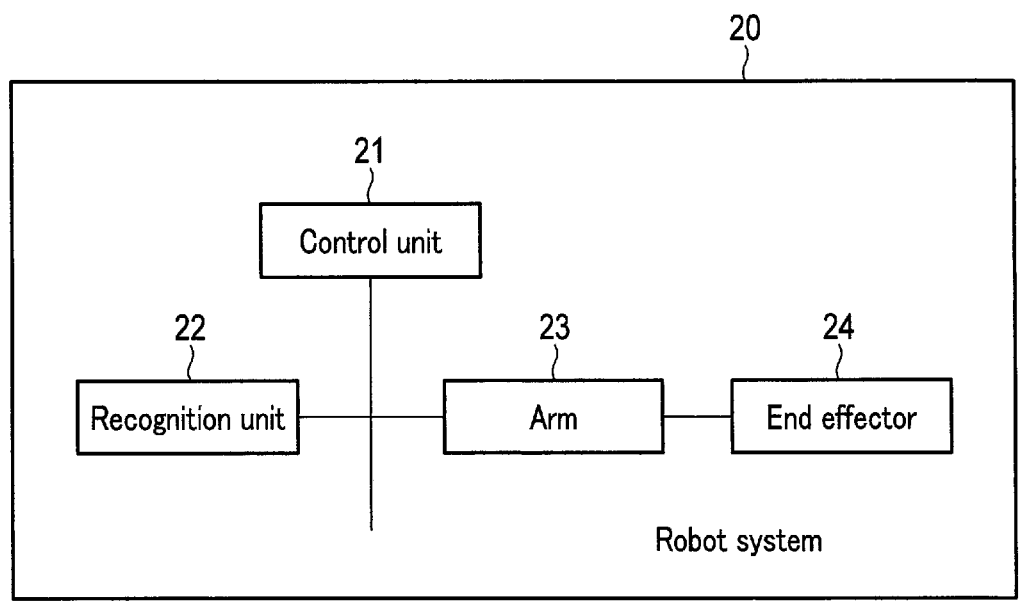
FIG. 3 is a block diagram showing a configuration example of a picking robot system according to the embodiment.

Next, the robot system 20 will be described. FIG. 3 is a block diagram showing a configuration example of the robot system 20. As shown in FIG. 3, the robot system 20 is comprised of a control unit 21, a recognition unit 22, an arm 23, and an end effector 24, etc.

The control unit 21 controls the entire operation of the robot system 20. For example, the control unit 21 activates the arm 23 based on a sensor signal, etc. from the recognition unit 22. The control unit 21 is comprised of, for example, a processor, a RAM, a ROM, and an NVM.

The recognition unit 22 obtains images of a discharged tray and a taken-out article in the tray. For example, the recognition unit 22 is a camera that takes a picture of the discharged tray above the tray. The recognition unit 22 transmits the taken picture to the control unit 21.

The arm 23 is a manipulator driven by the control of the control unit 21. The arm 23 is installed at a position that allows the arm 23 to pick an article from a tray discharged by the automatic warehouse 30. The arm 23 is comprised of a bar frame and a motor that drives the frame, and the like.

The end effector 24 is installed at the distal end of the arm 23. The end effector 24 is a member for trapping articles. The end effector 24 is driven based on the control of the control unit 21. For example, the end effector 24 is a gripper, a multifingered hand, or an adsorber. The end effector 24 is selected suitably for a taken-out article.

The robot system 20 may include a plurality of end effectors 24. The control unit 21 may change the end effector 24 in accordance with a taken-out article.

Next, the instruction image will be explained. FIG. 4 is a diagram showing an example of the instruction image 100. Herein, the instruction image 100 shows display areas indicating a taken-out article and icons for inputting operations. As shown in FIG. 4, the instruction image 100 displays display areas 101 through 104, input icon 105, a display area 106, a confirmation icon 107, a cancellation icon 108, and the like.

The display area 101 displays a code indicating a taken-out article. The display area 102 displays a name of a taken-out article. The display area 103 displays the picking number of a taken-out article.

The display area 104 indicates a location where the taken-out article is stored. In other words, the display area 104 indicates an area where the taken-out article is stored in a discharged tray. For example, the area where the taken-out article is stored is indicated by hatching in the display area 104.

The input icon 105 is an icon for inputting the number of units of a taken-out article actually picked by the robot system 20. The input icon 105 consists of the icons "0" through "9" and the icon "C" to clear an input.

The display area 106 displays the number of units input through the input icon 105.

The confirmation icon 107 is an icon for confirming the number of units of a taken-out article actually picked by the robot system 20. In other words, the confirmation icon 107 receives an operation to confirm the number displayed in the display area 106 as the number of units of a taken-out article picked.

The cancellation icon 108 is an icon for inputting cancellation of a picking operation.

Next, the functions realized by each unit of the picking system 1 are explained. First, the function realized by the control apparatus 10 is explained. The function realized by the control apparatus 10 is realized by executing a program stored in the ROM 12 or the NVM 14, etc., by the processor 11.

The processor 11 has a function of obtaining an instruction image from the input/output control apparatus 50 through the image interface 16. In other words, the processor 11 receives an image signal of the instruction image through the image interface 16. Herein, the processor 11 receives an image signal from the screening unit 80.

The processor 11 also has a function of generating picking information from the obtained instruction image. The processor 11 specifies the taken-out article indicated in the instruction image, the number of units of the taken-out article to be picked, and a location where the taken-out article is located, through image processing. For example, the processor 11 obtains locations (e.g., coordinates) of the display areas displaying the information indicating the taken-out article, the number units of the taken-out article to be picked, and the location of the taken-out article. For example, the processor 11 obtains from the NVM 14 locations of the display areas displaying the information indicating the taken-out article.

The processor 11 specifies the taken-out article from the display area indicating the taken-out article. For example, the processor 11 specifies the taken-out article from the display area by OCR (optical character recognition) processing.

The processor 11 specifies the picking number from the display area indicating the picking number. For example, the processor 11 specifies the picking number from the display area by the OCR processing.

Furthermore, the processor 11 specifies the location of the taken-out article from the display area indicating the location of the taken-out article. For example, the processor 11 specifies the location of the taken-out article by predetermined image processing.

In the example shown in FIG. 4, the processor 11 specifies the taken-out article from the display area 101 or the display area 102. The processor 11 specifies the picking number from the display area 103. The processor 11 specifies the location of the taken-out article from the display area 104.

After specifying the taken-out article, the picking number, and the location of the taken-out article, the processor 11 generates picking information. The picking information indicates the taken-out article, the picking number, and the location of the taken-out article. The picking information may include other information, and predetermined information may be excluded from the picking information. The configuration of the picking information is not limited to a particular configuration.

Furthermore, the processor 11 transmits the generated picking information to the robot system 20 through the communication unit 15.

The processor 11 has a function of obtaining completion information from the robot system 20 through the communication unit 15.

The completion information is data relating to a taken-out article actually taken out by the robot system 20. For example, the completion information indicates the number of units of a taken-out article.

The processor 11 has a function of transmitting an operation signal for inputting the article actually taken out into the input/output control apparatus 50 based on the completion information, through the operation interface 17.

The processor 11 inputs the number of units of an article taken out by the robot system 20 into the input/output control apparatus 50 based on the completion information. The processor 11 inputs, to the input/output control apparatus 50, an operation signal similar to the operation signal input by the operator into the input/output control apparatus 50 via the operation panel 60 to enter the number of units of an article.

For example, the processor 11 transmits, to the input/output control apparatus 50, the same operation signal as the operation signal input by tapping the input icon 105 for entering the number of units. Upon transmitting the operation signal, the processor 11 transmits to the input/output control apparatus 50 an operation signal indicating that the confirmation icon has been tapped.

Next, the functions realized by the robot system 20 will be described. The functions realized by the robot system 20 are realized by the control of the control unit 21.

The control unit 21 has a function of picking a taken-out article from a tray based on the picking information.

The control unit 21 receives the picking information from the control apparatus 10. The control unit 21 recognizes a discharged tray using the recognition unit 22. The control unit 21 refers to the picking information to specify a location where a taken-out article is located in the recognized tray. The control unit 21 may specify a detailed location of a taken-out article by performing image recognition on the taken-out article at the location.

The control unit 21 moves the arm 23 and the end effector 24 to the specified location. The control unit 21 picks the taken-out article at the specified location using the end effector 24.

For example, the control unit 21 introduces the picked taken-out article into a predetermined container. For example, the control unit 21 carries the taken-out article to the container by moving the arm 23. The control unit 21 controls the end effector 24 to introduce the taken-out article to the container.

The control unit 21 increases the number on the counter by one every time a taken-out article is picked. The control unit 21 continues picking the taken-out article until the counter reaches the picking number.

The control unit 21 also has a function of generating completion information. The control unit 21 generates completion information indicating a counter value. The control unit 21 transmits the completion information to the control apparatus 10.

Figure 5:
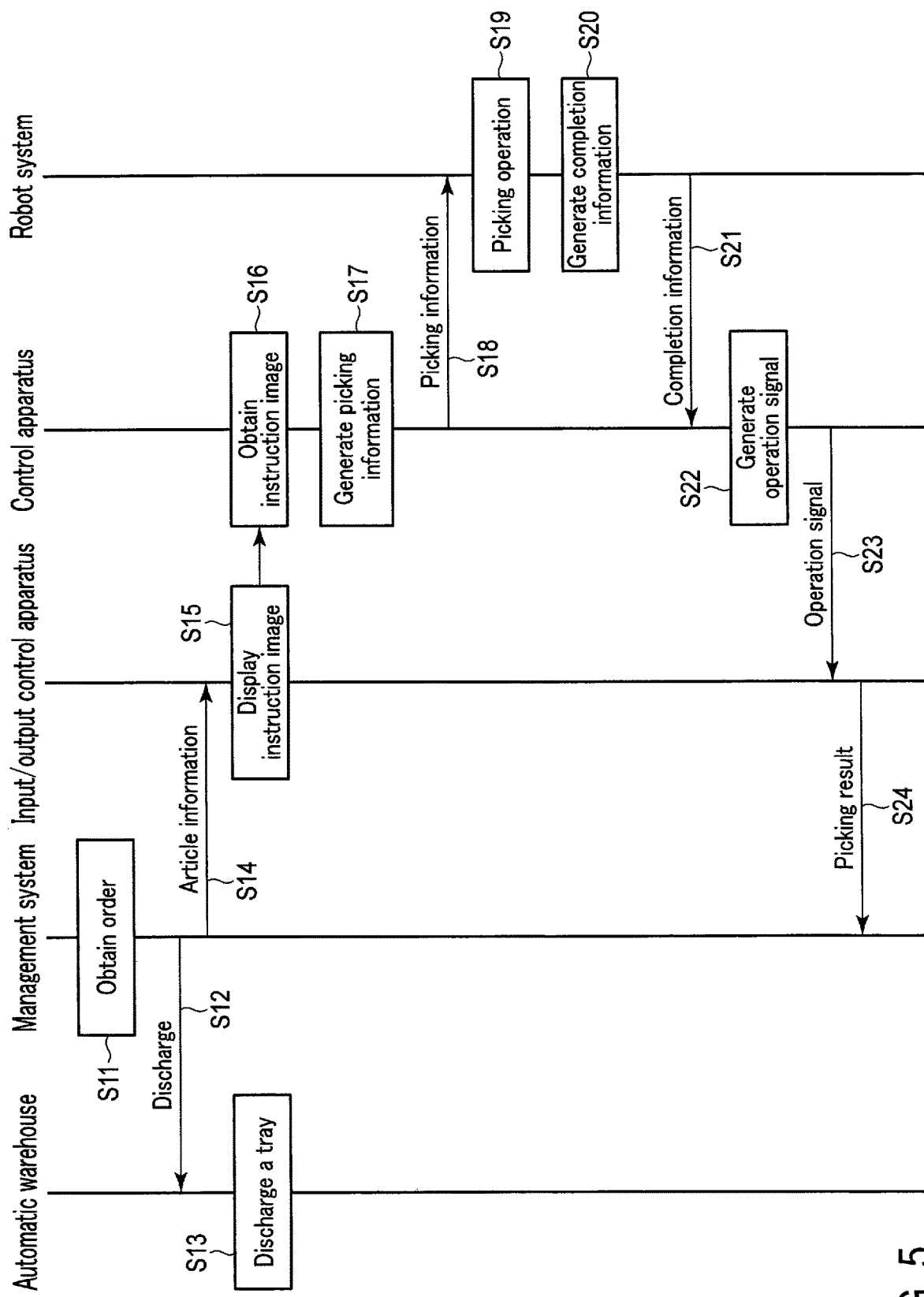
FIG. 5 is a sequence diagram indicating an operation example of the picking system according to the embodiment.

Next, an operation example of the picking system 1 will be described. FIG. 5 is a sequence diagram indicating an operation example of the picking system 1.

First, the management system 40 obtains an order (S11). Upon obtaining the order, the management system 40 transmits a signal to cause a tray to be discharged based on the order to the automatic warehouse 30 (S12).

The automatic warehouse 30 receives the signal. Upon receipt of the signal, the automatic warehouse 30 discharges the tray in accordance with the signal (S13). Furthermore, upon obtaining the order, the management system 40 transmits article information to the input/output control apparatus 50 based on the order (S14).

The input/output control apparatus 50 receives the article information. Upon receipt of the article information, the input/output control apparatus 50 generates an instruction image based on the article information, and outputs the instruction image to the splitter 70 (S15).

The processor 11 of the control apparatus 10 obtains the instruction image through the image interface 16 (S16). Upon obtaining the instruction image, the processor 11 generates the picking information based on the instruction image (S17). Upon the generation of the picking information, the processor 11 transmits the picking information to the robot system 20 through the communication unit 15 (S18).

The control unit 21 of the robot system 20 receives the picking information. Upon receipt of the picking information, the control unit 21 controls the recognition unit 22, the arm 23, and the end effector 24, and picks an article in accordance with the picking information (S19).

Upon picking of the article, the control unit 21 generates completion information relating to the picked article (S20). Upon generation of the completion information, the control unit 21 transmits the completion information to the control apparatus 10 (S21).

The processor 11 of the control apparatus 10 receives the completion information through the communication unit 15. Upon receipt of the completion information, the processor 11 generates an operation signal in accordance with the completion information (S22). Upon generation of the operation signal, the processor 11 transmits an operation signal to the input/output control apparatus 50 through the operation interface 17 (S23).

The input/output control apparatus 50 receives the operation signal. Upon receipt of the operation signal, the input/output control apparatus 50 transmits a signal relating to the picking to the management system 40 based on the operation signal (S24).

When the input/output control apparatus 50 transmits the management system 40 to the signal, the picking system 1 finishes the operation.

The picking system 1 does not necessarily have the screening unit 80. In this case, the processor 11 of the control apparatus 10 may have the function of the screening unit 80.

The control apparatus 10 and the robot system 20 may be integrally formed. For example, the processor 11 of the control apparatus 10 may control the recognition unit 22, the arm 23, and the end effector 24.

The management system 40 may realize the function of the input/output control apparatus 50. The automatic warehouse 30 and the management system 40 may be integrally formed. Furthermore, the picking system 1 does not necessarily have the automatic warehouse 30. In this case, the picking system 1 may have a warehouse to which the operator discharges a tray.

The picking information may indicate a plurality of types of taken-out articles. The management system 40 may transmit to the automatic warehouse 30 a signal causing a plurality of trays to be discharged. In this case, the robot system 20 may pick taken-out articles from the plurality of trays.

The control apparatus formed as described above obtains an image indicating a taken-out article to an operator from the input/output control apparatus connected to the management system. The control apparatus can generate picking information from the image. The control apparatus transmits the generated picking information from the robot system to cause the robot system to pick a taken-out article.

As a result, the control apparatus can input a taken-out article indicated on the image by the input/output control apparatus into the robot system. Thus, the control apparatus can automate the picking without a need for replacing or modifying an existing management system and input/output control apparatus that instructs a worker about a taken-out article through an image.

Furthermore, the control apparatus obtains from the robot system completion information regarding a taken-out article that has been actually picked. The control apparatus inputs, to the input/output control apparatus, the same operation signal as the operation signal input when the operator enters an operation. As a result, the control apparatus can input information regarding the picking into the existing management system, without a need for replacing or modifying the management system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A control apparatus comprising:
a splitter that splits and duplicates a signal from an input/output control apparatus;
an operation panel that displays an instruction image including information indicating an article to be picked and a number of units of the article based on receiving the signal from the input/output control apparatus;
an image interface that obtains a duplicate signal of the signal from the splitter;
a communication interface that transmits and receives data to and from a robot system that picks the article;
an operation interface that transmits, to the input/output control apparatus, an operation signal which is the same as an operation signal indicating a number of units input into the operation panel; and
a processor configured to:
generate picking information of the article to be picked based on the instruction image;
transmit the picking information to the robot system through the communication interface;
receive completion information relating to an article taken out by the robot system through the communication interface; and
transmit an operation signal for indicating the article taken out based on the completion information to the input/output control apparatus through the operation interface.

2. The control apparatus according to claim 1, wherein the processor generates the picking information further indicating a location where the article is stored in a tray that stores the article.

3. A non-transitory computer-readable storage medium storing a program for causing a computer to:
split and duplicate a signal from an input/output control apparatus using a splitter;
display through an operation panel an instruction image including information indicating an article to be picked and a number of units of the article based on receiving the signal from the input/output control apparatus;
obtain a duplicate signal of the signal from the splitter;
generate picking information of the article to be picked from the instruction image;
transmit the picking information to a robot system that picks the article through a communication interface that transmits and receives data to and from the robot system;
receive completion information relating to an article taken out by the robot system through the communication interface; and
transmit an operation signal for indicating the article taken out based on the completion information to the input/output control apparatus through an operation interface that transmits, to the input/output control apparatus, an operation signal which is the same as an operation signal indicating a number of units input into the operation panel.

4. A system comprising a control apparatus and a robot system, wherein:
the control apparatus comprises:
a splitter that splits and duplicates a signal from an input/output control apparatus;
an operation panel that displays an instruction image including information indicating an article to be picked and a number of units of the article based on receiving the signal from the input/output control apparatus;
an image interface that obtains a duplicate signal of the signal from the splitter; and
a communication interface that transmits and receives data to and from the robot system;
an operation interface that transmits, to the input/output control apparatus, an operation signal which is the same as an operation signal indicating an operation input into the operation panel; and
a processor configured to:
generate picking information of the article to be picked up from the instruction image;
transmit the picking information to the robot system through the communication interface;
receive completion information relating to an article taken out from the robot system through the communication interface; and
transmit an operation signal for indicating the article taken out based on the completion information to the input/output control apparatus through the operation interface; and
the robot system comprises:
an arm that picks the article; and
a control processor that receives the picking information from the control apparatus and picks the article using the arm based on the picking information.

5. The control apparatus according to claim 1, wherein the processor generates the picking information by performing OCR processing on characters included in the instruction image.

* * * * *